Dec. 25, 1951     V. CESARONI     2,579,728
SAW BLADE
Filed June 23, 1947
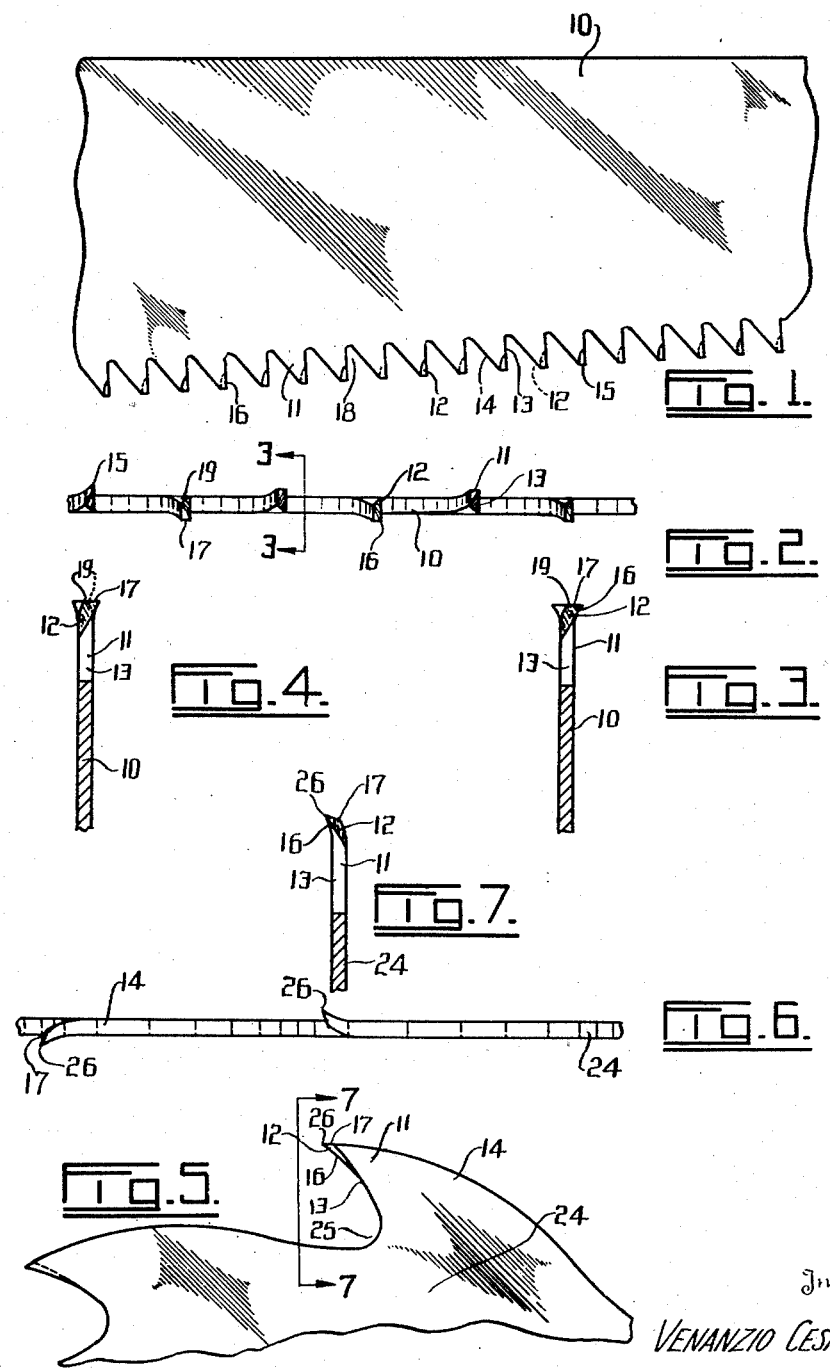
Inventor
VENANZIO CESARONI
By
Fetherstonhaugh & Co.
Attorney Patented Dec. 25, 1951

2,579,728

UNITED STATES PATENT OFFICE 2,579,728

SAW BLADE

Venanzio Cesaroni, Vancouver, British Columbia, Canada, assignor of sixty-two per cent to Sam H. Greer, Vancouver, British Columbia, Canada Application June 23, 1947, Serial No. 756,506
In Canada July 22, 1946

4 Claims. (Cl. 143—133)

1

This invention relates to improvements in hand and circular saws.

An object of the present invention is the provision of a saw which may be used with ease for ripping, crosscutting or diagonal cutting. Heretofore, saws have been divided into two classes for ripping and crosscutting, and the crosscut was usually used for diagonal cutting. The general rule was large teeth for ripping, and fine or small teeth for crosscutting. The saw according to this invention has relatively large teeth and they are designed so that they will accomplish any form of cutting with ease.

Other objects are to cut a very clean kerf and to be able to sharpen the saw quickly and easily.

The teeth are set near their tips on opposite sides of the saw blade, and each tooth has an outer cutting edge which forms a clean-cut side wall in the kerf, and another cutting edge angularly disposed in relation to the movement of the saw for cutting the material away from the bottom of the kerf. This is accomplished by bevelling the tooth at its inner corner. This bevel does not extend very far down the tooth and the remainder of the front edge thereof lies at right angles to the plane of the blade. This straight front edge moves the material after it is cut without jamming it against the sides of the kerf, thus reducing the amount of exertion necessary to move the blade. The inner corners of the teeth are at least in line with each other, or they may overlap a little in order that all the wood is cut and not torn away from the kerf bottom.

Two methods of carrying out this invention are illustrated in the accompanying drawings, in which:

Figure 1 is a side elevation of a portion of a hand saw blade,

Figure 2 is an enlarged plan view of a few teeth of this blade,

Figure 3 is a vertical section taken on the line 3—3 of Figure 2,

Figure 4 is a similar view to Figure 3 illustrating an alternative form of the invention, Figure 5 is a side elevation of a portion of a circular saw blade, Figure 6 is a plan view thereof, and Figure 7 is a vertical section taken on line 7—7 of Figure 5.

Referring more particularly to Figures 1 to 3, 10 is a hand saw blade having a plurality of teeth 11 along one edge which are alternately set near their tips on opposite sides thereof. As each tooth is the same only one will now be referred to. The tooth is bevelled adjacent its inner corner, as at 12, and has a vertical front edge 13 lying at right angles to the plane of the blade. It is preferable to make the rear edge 14 of the tooth straight across, that is, lying at right angles to the plane of the blade. The tip of the tooth is formed with a flat surface 15. A substantially vertical cutting edge 16 is formed at the outer forward corner of the tooth, while another cutting edge 17, angularly disposed in relation to the length of the blade, is formed at the tip of the tooth by the bevel 12 and the flat surface 15, the latter being substantially triangular in shape.

The teeth 11 are relatively large and pockets 18 are formed therebetween which are comparatively deep. The front and rear walls of these pockets, (the rear and front edges of the adjacent teeth) are straight across, excepting for the bevels 12 adjacent the tips of the teeth. The inner corners 19 of the teeth are at least in line with each other, as in Figure 3, or they may overlap a little, as in Figure 4. The flat surfaces 15 are all in the same plane. With this arrangement, there is the equivalent of a continuous cutting edge from the outer edge of each tooth to the other side of the blade.

When the saw is cutting material, say for example, wood, the cutting edges 16 cut the wood cleanly on each side of and just beyond the blade, thus forming a kerf with clean-cut side walls. The angular cutting edges 17 cut the wood away from the bottom of the kerf from one side to the other thereof. Each of the latter cutting edges cuts from substantially the middle of the kerf to an outer wall thereof and it is arranged at an angle to the movement of the saw blade so that the cutting action is natural and requires a minimum of effort. The pockets 18 are large enough to convey the particles of wood to the ends of the cut and the fact that the front and rear edges 13 and 14 are straight across permits them to move the particles without jamming them between the teeth and the sides of the kerf. The small bevel 12 provides the necessary angular cutting edge 17 and yet reduces to a minimum the possibility of jamming the particles.

Normally this saw may be sharpened merely by drawing a flat file over the flat surfaces 15 and two or three strokes at a time usually are sufficient. This action restores the cutting edge 17. Once in awhile, however, it is necessary to run a file over each of the bevels 12, thus restoring both the angular and vertical cutting edges.

With the cutting arrangement described above, it is possible to use large teeth to do the job which formerly required small teeth so that better removal of the particles is effected without jamming them between the blade and the kerf sides, resulting in considerably less effort being needed to operate the saw despite the big teeth.

Figures 5, 6, and 7 show a circular saw blade 24 incorporating this invention. In this case, the front edge 13 of each tooth 11 is not vertical but it is cut back under the tooth to form a large recess or pocket 25, and the rear edge 14 curves up and over the tooth. The bevel 12 is formed at the inner corner of the top of the tooth, but the flat surfaces 15 are omitted. A pointed tip 26 is formed at the outer corner of the tooth.

This circular saw functions in the same manner as the hand saw. It requires less power to do a certain job, it makes very clean cuts, and it may be used for ripping, crosscutting or diagonal cutting. This saw is sharpened by running a file over the bevels 12, and a few strokes over the rear edge 14 at and towards the tip 26 helps.

What I claim as my invention is:

1. A saw comprising a blade, a plurality of straight-sided teeth formed at the edge of the blade, each having a tip at its outer end, said teeth being alternately set at their tips on opposite sides of the blade with large recesses formed in said blade at the front edges of the teeth, the tip of each tooth being bevelled at the inner corner of the front edge thereof which has been moved inwardly over the blade by the setting to form a transverse angular cutting edge, each tooth having its front edge between the bevel and the blade lying at right angles to the plane of the blade and a substantially vertical cutting edge at the outer side of the bevelled portion thereof, and all said inner corners being at least in line with each other.

2. A saw comprising a blade, a plurality of teeth formed at the edge of the blade and alternately set near their tips on opposite sides thereof, each tooth being bevelled adjacent its inner corner which has been moved inwardly over the blade by the setting and having a flat surface constituting its outer end forming with the bevel surface an angular cutting edge, and all the flat surfaces being in the same plane.

3. A saw comprising a blade, a plurality of straight-sided teeth formed at the edge of the blade, each having a tip at its outer end, said teeth being alternately set at their tips on opposite sides of the blade, the tip of each tooth being bevelled at the inner corner of the front edge thereof which has been moved inwardly over the blade by the setting, each tooth having a flat surface constituting its outer end, and all the flat surfaces being in the same plane, and each tooth having a transverse angular cutting edge formed by the intersection of the bevelled and flat surfaces thereof.

4. A saw comprising a blade, a plurality of straight-sided teeth formed at the edge of the blade, each having a tip at its outer end, said teeth being alternately set at their tips on opposite sides of the blade, the tip of each tooth being bevelled at the inner corner of the front edge thereof which has been moved inwardly over the blade by the setting, each tooth having a flat surface constituting its outer end, the intersection of the bevelled and flat surfaces of each tooth forming a transverse angular cutting edge, and all the flat surfaces being in the same plane, each tooth having its front edge between the bevel and the blade lying at right angles to the plane of the blade and a substantially vertical cutting edge at the outer side of the bevelled portion thereof, and all said inner corners being at least in line with each other to form the equivalent of a continuous cutting edge from the outer edges of the teeth to the other side of the blade.

VENANZIO CESARONI.

REFERENCES CITED

The following references are of record in the file of this patent:

UNITED STATES PATENTS

| Number | Name | Date |
| --- | --- | --- |
| 615,005 | Walquist | Nov. 29, 1898 |
| 858,652 | Harrison | July 2, 1907 |
| 1,666,987 | Billingsley | Apr. 24, 1928 |
| 2,270,776 | Thornton | Jan. 20, 1942 |
| 2,351,737 | Blum | June 20, 1944 |